United States Patent
Lu

(10) Patent No.: US 8,942,127 B2
(45) Date of Patent: Jan. 27, 2015

(54) WIRELESS NETWORK DEVICE AND AUTOMATIC PARAMETER SETTING METHOD THEREOF

(71) Applicant: Accton Technology Corporation, Hsinchu (TW)

(72) Inventor: Tan-Chun Lu, New Taipei (TW)

(73) Assignee: Accton Technology Corporation, Hsinchu (TW)

( * ) Notice: Subject to any disclaimer, the term of this patent is extended or adjusted under 35 U.S.C. 154(b) by 154 days.

(21) Appl. No.: 13/673,797

(22) Filed: Nov. 9, 2012

(65) Prior Publication Data

US 2013/0121190 A1 May 16, 2013

(30) Foreign Application Priority Data

Nov. 11, 2011 (TW) .............................. 100141303 A

(51) Int. Cl.
*H04L 1/18* (2006.01)
*H04W 24/00* (2009.01)
*H04W 28/18* (2009.01)

(52) U.S. Cl.
CPC ............. *H04W 24/00* (2013.01); *H04L 1/1825* (2013.01); *H04L 1/188* (2013.01); *H04W 28/18* (2013.01)

USPC .......................................... 370/252; 370/328

(58) Field of Classification Search
CPC .............................. H04W 28/18; H04L 1/1825
See application file for complete search history.

(56) References Cited

U.S. PATENT DOCUMENTS

2010/0098204 A1* 4/2010 Ratiu et al. ..................... 375/371
2010/0241919 A1* 9/2010 Jeon .............................. 714/750

* cited by examiner

*Primary Examiner* — Jianye Wu
(74) *Attorney, Agent, or Firm* — Muncy, Geissler, Olds & Lowe, P.C.

(57) ABSTRACT

A wireless network device and an automatic parameter setting method thereof are provided. The device includes a wireless communication module and an operation module. The wireless communication module is used for transmitting a test signal to a wireless device according to a wireless communication protocol, and receiving an ACK frame transmitted by the wireless device. The operation module is electrically connected to the wireless communication module, and is used for calculating one half of a sum of a minimum transmission time and a maximum transmission time, setting the half of the sum as an ACK timeout interval of the wireless communication module, analyzing whether the ACK frame is obtained within the ACK timeout interval so as to determine whether to use the ACK timeout interval as the maximum transmission time or the minimum transmission time, and recalculating the ACK timeout interval.

19 Claims, 4 Drawing Sheets

WIRELESS NETWORK DEVICE AND AUTOMATIC PARAMETER SETTING METHOD THEREOF

CROSS-REFERENCE TO RELATED APPLICATION

This application claims the benefit of Taiwan Patent Application No. 100141303, filed on Nov. 11, 2011, which is hereby incorporated by reference for all purposes as if fully set forth herein.

BACKGROUND OF THE INVENTION

1. Field of Invention

The present invention relates to a wireless network device, and more particularly, to a wireless network device capable of automatically setting a parameter for signal transmission with a wireless device.

2. Related Art

Nowadays, a wireless network device adopts a Carrier Sense Multiple Access with Collision Avoidance (CSMA/CA) technology for medium access control, and after sending data, acknowledges that the data transmission is successful according to an ACK frame received within a preset ACK timeout interval.

FIG. 1 is a schematic view of data collision of wireless network devices in the prior art. Referring to FIG. 1, a first network device 11 sends data to a second network device 12, and the second network device 12 returns an ACK frame to the first network device 11 after successfully receiving the data. If the first network device 11 receives the ACK frame within a preset time interval after the data is sent, it indicates that the data transmission is successful; on the contrary, if the first network device 11 does not receive the ACK frame within the preset time interval after the data is sent, it indicates that the data transmission is fail, and in this case, the first network device 11 retransmits the data after the preset time interval is timed out.

As shown in FIG. 1, a packet turnaround time T1 between the first network device 11 and the second network device 12 includes the following: (1) a packet transmission time from the first network device 11 to the second network device 12; (2) a working time T3 of the second network device 12, where the working time T3 includes a packet processing time, a short inter frame space (SIFS) and other necessary processing time required by the second network device 12 to transmit the ACK frame; and (3) an ACK transmission time from the second network device 12 to the first network device 11. It should be understood that the packet transmission time and the ACK transmission time are the same transmission time T2, and the packet turnaround time T1 is two times the transmission time T2 plus the working time T3 of the second network device 12, that is, $T1=(2*T2)+T3$. Therefore, an ACK timeout interval T4 is a sum of the packet turnaround time T1 and the working time T3. It can be known from the above that, if the first network device and the second network device are far away from each other, as the transmission time T2 increases, the packet turnaround time T1 may be larger than the ACK timeout interval T4, so that the sending network device misjudges that the previous data transmission fails, and sends the data again, resulting in false operation.

If the first network device 11 and the second network device 12 are installed outside to serve for bridging data packets sent by a wireless terminal apparatus, a distance between the two network devices 11 and 12 is generally far from each other. Due to above mentioned reasons, the distance between the two wireless network devices or ACK timeout intervals usually needs to be manually configured to the wireless network device separately by technicians. Therefore, the wireless network device could avoid leading false operations in various distances by the configured distance or ACK timeout interval.

However, such operations for configuring distance or ACK timeout interval are mostly completed manually, and the distance between the network devices needs to be measured in advance through various measurement methods. Also, the distance can be defined by adjusting and setting the ACK timeout interval in a try-error manner or setting a large ACK timeout interval. Therefore, it will lead a rather labor- and time-consuming.

Therefore, how to automatically and properly set a parameter value for an ACK timeout interval of a wireless network device is a problem to be considered by manufacturers nowadays.

SUMMARY OF THE INVENTION

To solve the above problems, the present invention is directed to a wireless network device capable of automatically and correctly setting a signal transmission parameter before transmitting data, and an automatic parameter setting method thereof.

The present invention provides a wireless network device, comprising a wireless communication module and an operation module. The wireless communication module is used for transmitting a test signal to a wireless device according to a wireless communication protocol, and receiving an ACK frame returned by the wireless device corresponding to the test signal. The operation module is electrically connected to the wireless communication module, and is used for setting an ACK timeout interval according to one half of a sum of a minimum transmission time and a maximum transmission time, and the ACK timeout interval as the maximum transmission time or the minimum transmission time according to whether the ACK frame is obtained within the ACK timeout interval.

In an embodiment of the present invention, the operation module uses the ACK timeout interval as the minimum transmission time when the ACK frame is not received within the ACK timeout interval. On the contrary, the operation module uses the ACK timeout interval as the maximum transmission time when the ACK frame is received within the ACK timeout interval, and recalculates the ACK timeout interval.

The present invention provides an automatic parameter setting method of a wireless network device, applicable to a wireless network device performing wireless signal communication with a wireless device, where the wireless network device comprises a parameter of an ACK timeout interval. The method comprises: step (a) transmitting a test signal to the wireless device; step (b) using the ACK timeout interval as the minimum transmission time when an ACK frame is not received within the ACK timeout interval, or using the ACK timeout interval as the maximum transmission time when the ACK frame is received within the ACK timeout interval; and step (c) setting the ACK timeout interval according to one half of a sum of the maximum transmission time and the minimum transmission time.

In an embodiment of the present invention, the automatic parameter setting method of a wireless network device further comprises: step (d) stopping the step (a) to the step (c) when judging that a difference between the maximum transmission time and the minimum transmission time is smaller than or equal to a time interval threshold.

The wireless network device and the automatic parameter setting method thereof according to the present invention can automatically calculate the ACK timeout interval, thereby solving the problem that an incorrect ACK timeout interval is obtained due to an incorrect distance between devices that is calculated manually. Furthermore, the present invention is applicable to a wireless network device in dynamic motion.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Preferred embodiments of the present invention are described in detail below with reference to the accompanying drawings.

Figure 1:
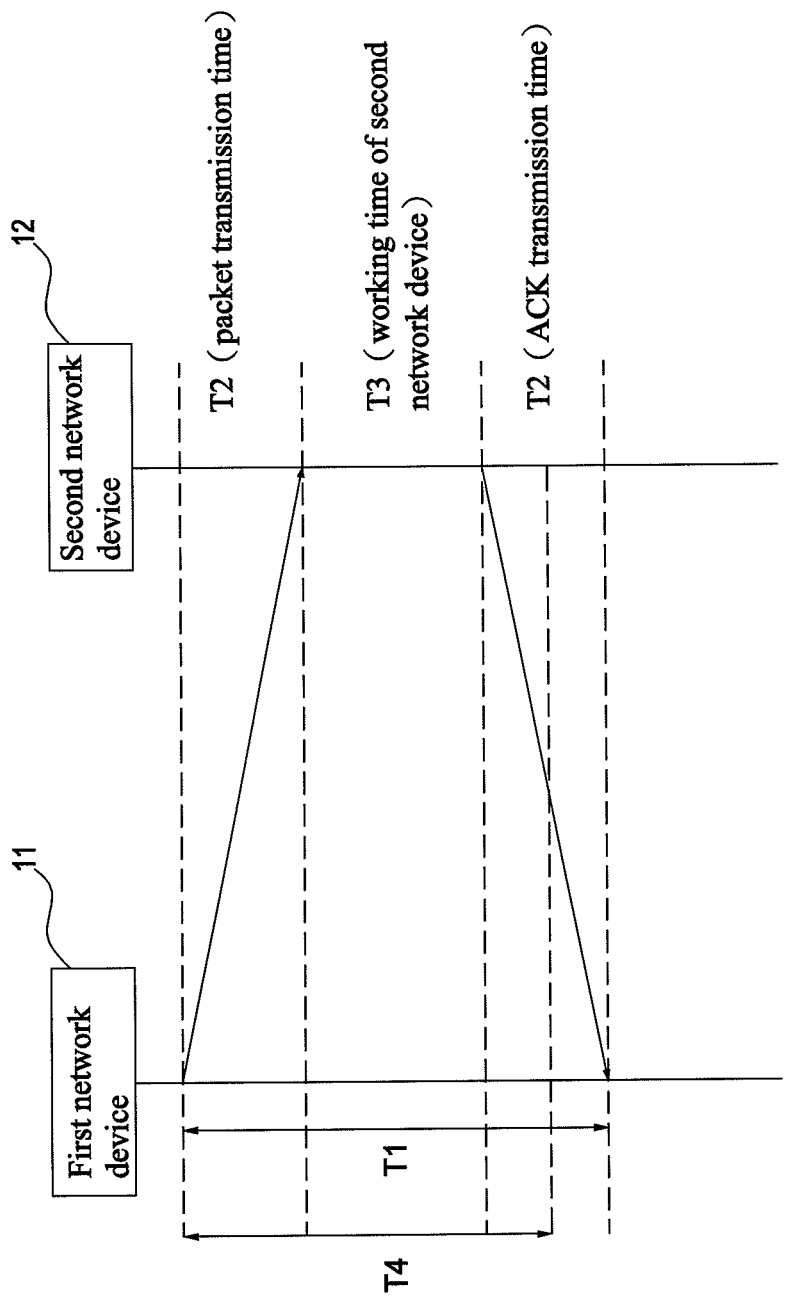
FIG. 1 is a schematic view of data collision of a wireless network system in the prior art.
Figure 2:
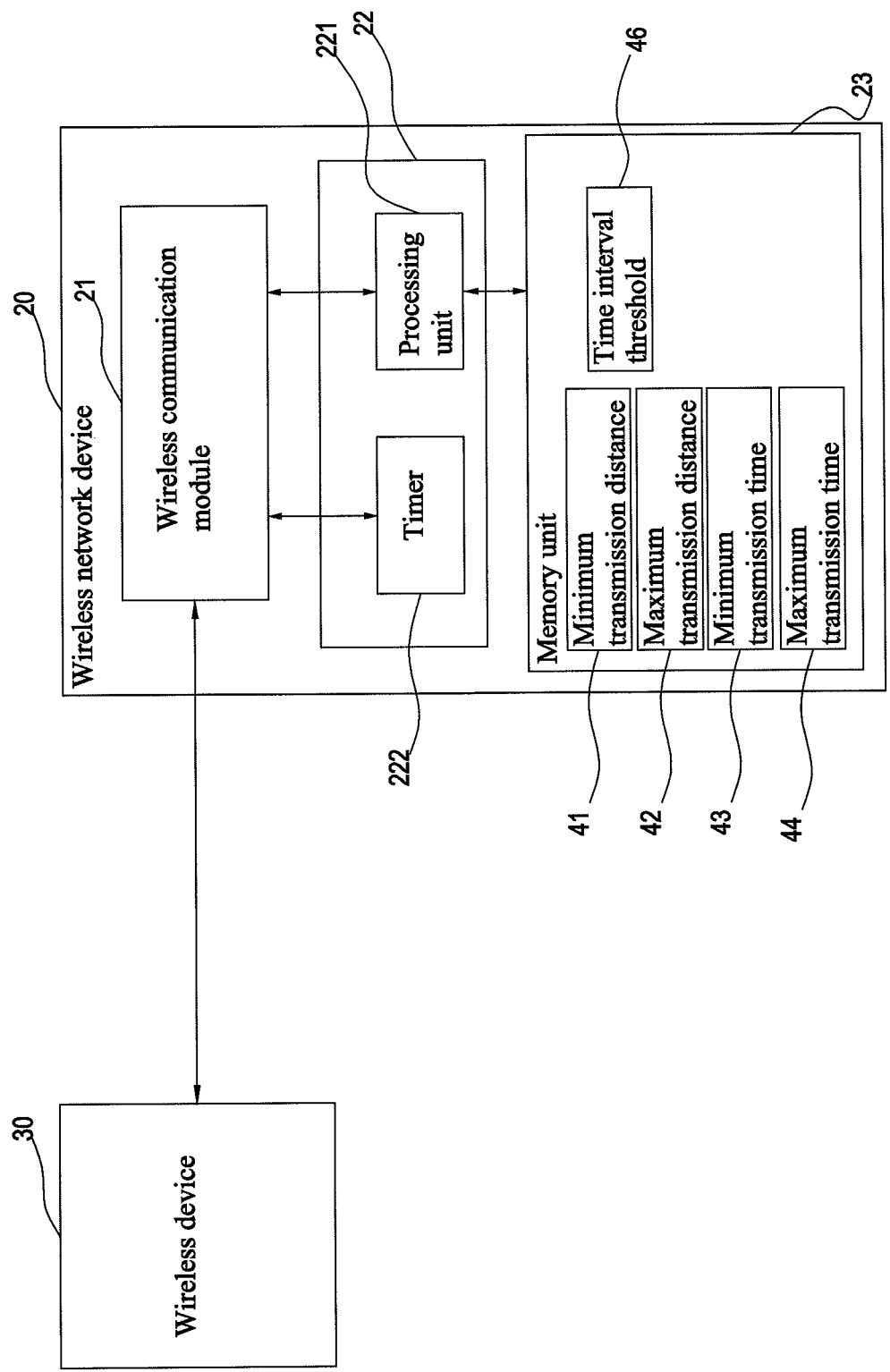
FIG. 2 is a schematic architectural view of a wireless network system according to the present invention.
Figure 3:
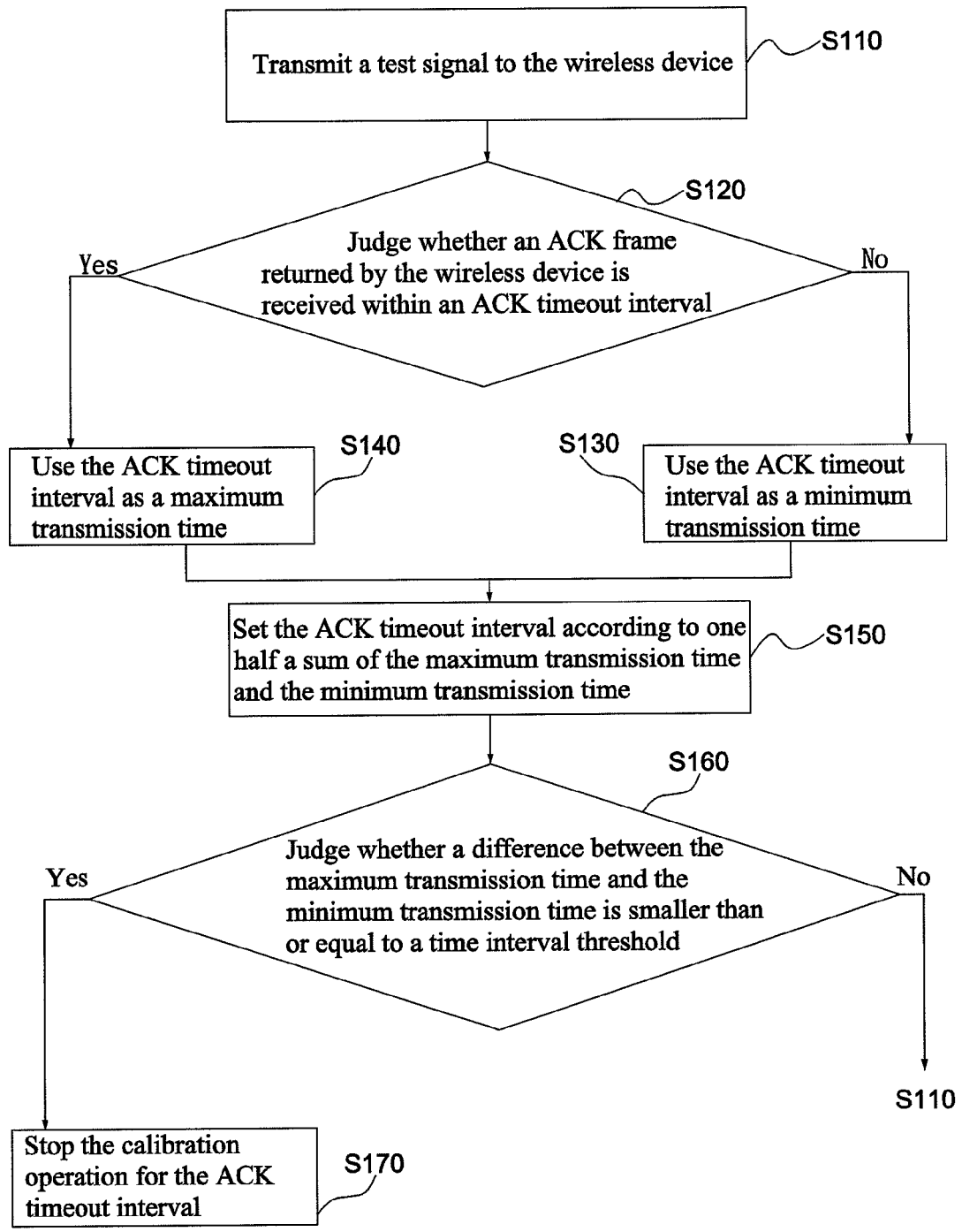
FIG. 3 is a schematic flow chart of an automatic parameter setting method of a wireless network device according to the present invention.

FIG. 2 is a schematic architectural view of a wireless network system according to an embodiment of the present invention, and FIG. 3 is a schematic flow chart of an automatic parameter setting method of a wireless network device according to an embodiment of the present invention.

The network system includes a wireless network device 20 and a wireless device 30. A distance between the wireless network device 20 and the wireless device 30 needs to be smaller than an allowed distance that the wireless network device 20 and the wireless device 30 can communicate with each other. In an embodiment of the present invention, the wireless network device 20 and the wireless device 30 are used for receiving or bridging data and/or voice data transmitted by a terminal device through wireless communication. When the network system is built, the wireless network device 20 and the wireless device 30 are installed within the allowed distance, and the distance parameters for setting the distance between the wireless network device 20 and the wireless device 30 are respectively set in the wireless network device 20 and the wireless device 30. The wireless network device 20 and the wireless device 30 will thus determine an initial ACK timeout interval according to the distance parameters.

In an embodiment of the present invention, the wireless network device 20 includes a wireless communication module 21 and an operation module 22. In present embodiment of invention, the wireless communication module 21 can be an element, circuit or module component for transmitting and receiving wireless signals, for example, an element, circuit or module for transmitting and receiving signals via wireless communication technologies such as Wi-Fi, Wi-Max, 3G, 3.5G or 4G. In an embodiment of the present invention, the operation module 22 can be a combination of a processing unit 221 and a timer 222. However, the operation module 22 may be various processors (such as a central processing unit, a micro processing unit, and a micro computing unit), computing chips, or combined circuits of processors and timers, and other equivalent integrated circuits (IC), electronic elements or element combinations of relevant functions and types may also be used as the operation module 22, but the present invention is not limited thereto.

In an embodiment of the present invention, a maximum transmission distance 42 and a minimum transmission distance 41 may be configured through a user interface of the wireless network device 20. The maximum transmission distance 42 refers to the longest distance of wireless transmission supported by the wireless network device 20; and the minimum transmission distance 41 refers to the shortest distance of wireless transmission supported by the wireless network device 20.

The wireless network device 20 calculates numerical values such as a maximum transmission time 44, a minimum transmission time 43 and the ACK timeout interval according to the maximum transmission distance 42 and the minimum transmission distance 41. The maximum transmission time 44 is a time required for transmitting a packet for the maximum transmission distance; and the minimum transmission time 43 is a time required for transmitting a packet for the minimum transmission distance. The minimum transmission time and the maximum transmission time are respectively obtained by dividing the minimum transmission distance and the maximum transmission distance by a signal transmission rate.

In another embodiment, the maximum transmission time 44 and the minimum transmission time 43 may also be configured through a user interface, and accordingly, numerical values such as the maximum transmission distance 42, the minimum transmission distance 41 and the ACK timeout interval can be calculated according to the configured numerical values.

In an embodiment of the present invention, the ACK timeout interval is obtained according to an equation, which is ACK timeout interval=(minimum transmission time+ maximum transmission time)/2. Therefore, the ACK timeout interval is one half of a sum of the minimum transmission time and the maximum transmission time.

The processing unit 221 sets an ACK timeout interval for the wireless communication module 21. The wireless communication module 21 transmits the ACK timeout interval to the timer 222. The timer 222 performs a subsequent timing operation according to the ACK timeout interval.

A process of the automatic parameter setting method of the wireless network device is described below.

A test signal is transmitted to the wireless device according to a wireless communication protocol (Step S110). In this step, the test signal is transmitted by the wireless communication module 21 to the wireless device 30. The specification and packet format of the test signal depend on demands of designers, and are not limited herein as long as IEEE802.11x specifications are complied with. In this step, the test signal is, for example, a packet.

It is judged whether an ACK frame returned by the wireless device 30 is received within an ACK timeout interval (Step S120). In this step, the wireless communication module 21 enables the timer 222 to start a timing event corresponding to the ACK timeout interval, and the timer 222 starts timing at a transmission time point of the test signal, and notifies the wireless communication module 21 once the ACK timeout interval is timed out, so that the wireless communication module 21 notifies the processing unit 221 in turn that the ACK timeout interval is timed out.

On the other hand, after obtaining the test signal, the wireless device 30 processes the test signal to generate a corresponding ACK frame, and returns the ACK frame to the wireless network device 20. When obtaining the ACK frame, the wireless communication module 21 notifies the processing unit 221. In an embodiment of the present invention, the processing unit 221 judges whether the ACK frame is received within the ACK timeout interval starting from the transmission time point of the test signal, and the judgment is made according to whether the operation module 22 ends timing first or obtains the ACK frame first within the ACK timeout interval.

When the ACK frame is not received within the ACK timeout interval, the ACK timeout interval is used as the minimum transmission time (Step S130). In this step, when the processing unit 221 does not obtain the ACK frame after the ACK timeout interval is timed out, the processing unit 221 sets the minimum transmission time 43 to be equal to the ACK timeout interval according to the ACK timeout interval.

When the ACK frame is received within the ACK timeout interval, the ACK timeout interval is used as the maximum transmission time (Step S140). In this step, when the processing unit 221 obtains the ACK frame within the ACK timeout interval, the processing unit 221 sets the maximum transmission time 44 to be equal to the ACK timeout interval according to the ACK timeout interval.

The ACK timeout interval is set according to one half of a sum of the maximum transmission time and the minimum transmission time (Step S150). In this step, the processing unit 221 sums the maximum transmission time and the minimum transmission time, calculates one half of the sum, and sets the ACK timeout interval to be equal to the half. Thus, a preliminary adjusted value of the ACK timeout interval is obtained. The preliminary adjusted value is more accurate than the previously designed ACK timeout interval. Therefore, the wireless network device of the present invention can efficiently perform data transmission operations, thereby improving the communication quality.

However, to further improve the adaptability and performance of the device and communication, the ACK timeout interval may be continuously adjusted according to the following process, so as to find a more accurate adjusted value. Description is given below.

It is judged whether a difference between the maximum transmission time and the minimum transmission time is smaller than or equal to a time interval threshold (Step S160). In this step, the processing unit 221 calculates a current difference between the maximum transmission time 44 and the minimum transmission time 43, and compares the difference with a time interval threshold 46. When the difference is larger than the time interval threshold 46, the processing unit 221 returns to Step S110, and continues to execute related steps. Otherwise, the processing unit 221 stops the calibration operation for the ACK timeout interval (Step S170), that is, the processing unit 221 does not execute Step S110 to Step S150. The time interval threshold 46 may be pre-stored in a memory unit 23, but the present invention is not limited thereto. It should be noted that, Step S160 may be implemented before or after Step S150, or before Step S120.

However, to prevent the calibration operation from being influenced by external environmental factors, a fault tolerant mechanism may be added into the process of setting the ACK timeout interval, that is, the wireless communication module 21 periodically sends the test signal, for example, the wireless communication module 21 continuously outputs the test signal a plurality of times at the same ACK timeout interval. When the processing unit 221 finds through analysis that the wireless communication module 21 obtains the ACK frame at least once among the plurality of times, it is determined that the ACK timeout interval is correct. On the contrary, if the wireless communication module 21 does not obtain the ACK frame, the calibration operation is restarted.

Moreover, the wireless device 30 may also be the wireless network device 20 or same or similar hardware architecture or function, but the present invention is not limited thereto.

Figure 4:
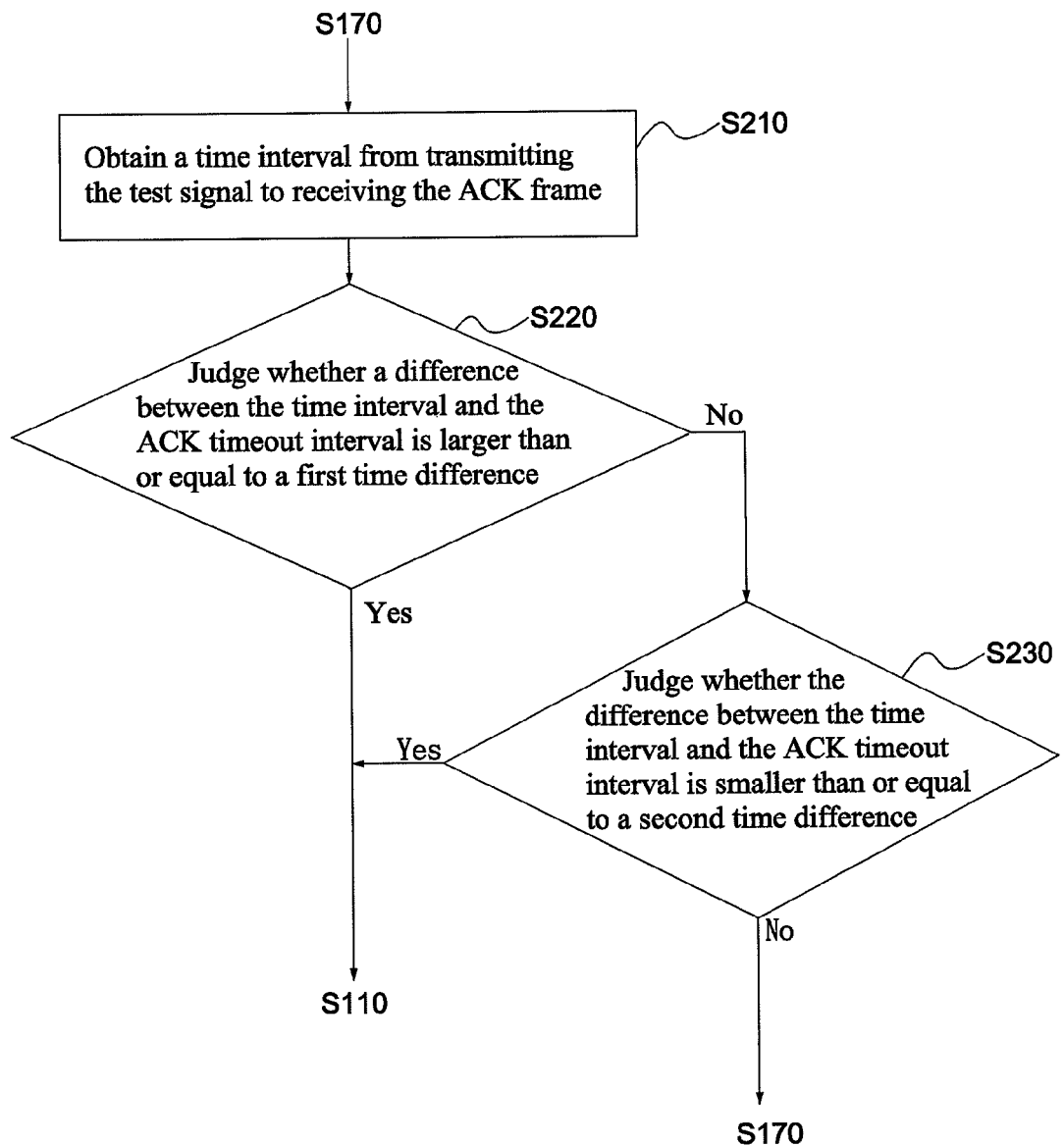
FIG. 4 is a schematic flow chart of an automatic parameter setting method of a wireless network device for a wireless device in dynamic motion according to an embodiment of the present invention.

FIG. 4 is a schematic flow chart of an automatic parameter setting method of a wireless network device for a wireless device in dynamic motion according to an embodiment of the present invention. The parameter setting method is started after the calibration operation for the ACK timeout interval is completed, that is to say, the ACK timeout interval has been preliminarily set. In addition, the process can also be applied when the transmission distance between the wireless network device 20 and the wireless device changes, so as to readjust the ACK timeout interval. The process of the method is described below.

A time interval from transmitting the test signal to receiving the ACK frame is obtained (Step S210). In this step, the operation module 22 periodically outputs the test signal to the wireless device 30 through the wireless communication module 21 again, so as to find a time interval of an operation duration from outputting the test signal to receiving the ACK frame. In an embodiment of the present invention, two methods exist for obtaining the time interval.

(1) The processing unit 221 first transmits the test signal to the wireless device 30 through the wireless communication module 21. The wireless communication module 21 requires the processing unit 221 to start a timing event corresponding to the ACK timeout interval, and the operation module 22 stores a transmission time point of the test signal. The wireless device 30 processes the test signal transmitted by the wireless communication module 21, and returns a corresponding ACK frame. The processing unit 221 obtains the ACK frame through the wireless communication module 21 and stores a receiving time point of the ACK frame. Then, the processing unit 221 obtains the time interval by calculating a difference between the transmission time point of the test signal and the receiving time point of the ACK frame.

(2) The processing unit 221 first transmits the test signal to the wireless device 30 through the wireless communication module 21, and meanwhile starts a timing operation when outputting the test signal. Once the processing unit 221 obtains through the wireless communication module 21 the ACK frame transmitted by the wireless device 30, the processing unit 221 stops the timing operation, and obtains the time interval through the timing operation.

It is judged whether a difference between the time interval and the ACK timeout interval is larger than or equal to a first time difference (Step S220), and it is judged whether the difference between the time interval and the ACK timeout interval is smaller than or equal to a second time difference (Step S230). In an embodiment of the present invention, the first time difference is larger than the second time difference. In this step, the processing unit 221 first calculates a difference between the time interval and the ACK timeout interval. When the processing unit 221 judges that the difference between the time interval and the ACK timeout interval is larger than or equal to the first time difference, or is smaller than or equal to the second time difference, the processing unit 221 returns to Step S110. On the contrary, when the processing unit 221 judges that the difference between the time interval and the ACK timeout interval is not larger than or equal to the first time difference, and is not smaller than or equal to the second time difference, the processing unit 221 returns to Step S170.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wireless network device, capable of performing signal transmission with a wireless device, the wireless network device comprising:
   a wireless communication module, for transmitting a test signal to the wireless device according to a wireless communication protocol, and receiving an ACK frame returned by the wireless device corresponding to the test signal; and
   an operation module, electrically connected to the wireless communication module, for executing a parameter setting step, wherein the parameter setting step comprises setting an ACK timeout interval according to one half of a sum of a minimum transmission time and a maximum transmission time, and using the ACK timeout interval as the maximum transmission time or the minimum transmission time according to whether ACK frame is obtained within the ACK timeout interval.

2. The wireless network device according to claim 1, wherein the operation module sets the ACK timeout interval as the minimum transmission time when the ACK frame is not obtained within the ACK timeout interval.

3. The wireless network device according to claim 1, wherein the operation module sets the ACK timeout interval as the maximum transmission time when the ACK frame is received within the ACK timeout interval.

4. The wireless network device according to claim 1, wherein the operation module further stops the parameter setting step when judging that a difference between the maximum transmission time and the minimum transmission time is smaller than or equal to a time interval threshold.

5. The wireless network device according to claim 4, wherein after stopping the parameter setting step, the operation module further sends the test signal and receives the ACK frame corresponding to the test signal, and judges whether a difference between a time interval and the ACK timeout interval is larger than or equal to a first time difference and whether the difference between the time interval and the ACK timeout interval is smaller than or equal to a second time difference, so as to determine whether to execute the parameter setting step.

6. The wireless network device according to claim 5, wherein the time interval is obtained by calculating a difference between a transmission time point of the test signal and a receiving time point of the ACK frame after the operation module transmits the test signal to the wireless device and receives the ACK frame transmitted by the wireless device.

7. The wireless network device according to claim 5, wherein the time interval is obtained by the operation module through a timing operation of starting timing when transmitting the test signal and stopping timing when receiving the ACK frame transmitted by the wireless device.

8. The wireless network device according to claim 5, wherein the operation module executes the parameter setting step when judging that the difference between the time interval and the ACK timeout interval is larger than or equal to the first time difference, or judging that the difference between the time interval and the ACK timeout interval is smaller than or equal to the second time difference.

9. The wireless network device according to claim 1, wherein the test signal is a data packet or a frame.

10. The wireless network device according to claim 1, wherein the operation module further sends the test signal a plurality of times; and determines that the ACK timeout interval is correct when the ACK frame is obtained at least once.

11. The wireless network device according to claim 1, wherein the operation module further sends the test signal a plurality of times; and executes the parameter setting step when the ACK frame is not obtained after the test signal is sent the plurality of times.

12. The wireless network device according to claim 1, wherein the wireless communication protocol complies with IEEE802.11 specifications.

13. An automatic parameter setting method, applicable to a wireless network device performing wireless signal communication with a wireless device, wherein the wireless network device comprises a parameter of an ACK timeout interval, the method comprising:
   step (a) transmitting a test signal to the wireless device according to a wireless communication protocol;
   step (b) using the ACK timeout interval as a minimum transmission time when an ACK frame is not received within the ACK timeout interval, or using the ACK timeout interval as a maximum transmission time when the ACK frame is received within the ACK timeout interval; and
   step (c) setting the parameter of the ACK timeout interval according to one half of a sum of the maximum transmission time and the minimum transmission time.

14. The automatic parameter setting method according to claim 13, further comprising:
   step (d) stopping the step (a) to the step (c) when judging that a difference between the maximum transmission time and the minimum transmission time is smaller than or equal to a time interval threshold.

15. The automatic parameter setting method according to claim 14, wherein after the step (d), the method further comprises:
   obtaining a time interval from transmitting the test signal to receiving the ACK frame; and
   re-executing the step (a) to the step (d) when a difference between the time interval and the ACK timeout interval is larger than or equal to a first time difference, or when the difference between the time interval and the ACK timeout interval is smaller than or equal to a second time difference.

16. The automatic parameter setting method according to claim 15, wherein the step of obtaining a time interval from transmitting the test signal to receiving the ACK frame comprises:
   transmitting the test signal to the wireless device;
   receiving the ACK frame transmitted by the wireless device; and
   calculating the time interval between a transmission time point of the test signal and a receiving time point of the ACK frame.

17. The automatic parameter setting method according to claim 15, wherein the step of obtaining a time interval from transmitting the test signal to receiving the ACK frame comprises:
   starting an timing operation when the test signal is transmitted to the wireless device; and
   stopping the timing operation when the ACK frame transmitted by the wireless device is received, and obtaining a time interval through the timing operation.

18. The automatic parameter setting method according to claim 13, wherein the wireless communication protocol complies with IEEE802.11 specifications.

19. The automatic parameter setting method according to claim 13, wherein the test signal is a data packet or a frame.

* * * * *